(12) United States Patent
Valentine et al.

(10) Patent No.: US 6,356,751 B1
(45) Date of Patent: Mar. 12, 2002

(54) SYSTEM AND METHOD FOR BRIDGING AN EMERGENCY CALL WITH AN OPTIMIZED SATELLITE CALL

(75) Inventors: Eric Valentine, Plano; Vladimir Alperovich, Dallas, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/344,201

(22) Filed: Jun. 24, 1999

(51) Int. Cl.[7] ............................................... H04M 11/00
(52) U.S. Cl. ...................... 455/404; 455/416; 455/427; 455/520; 455/521; 455/560
(58) Field of Search ................................. 455/404, 416, 455/426, 427, 428, 445, 461, 12.1, 518, 519, 520, 521, 552, 553, 558, 560; 370/260, 261, 316

(56) References Cited

U.S. PATENT DOCUMENTS

| | | | |
|---|---|---|---|
| 5,896,565 A | * 4/1999 | Miller | 455/404 |
| 6,038,438 A | * 3/2000 | Beeson et al. | 455/404 |
| 6,185,430 B1 | * 2/2001 | Yee et al. | 455/519 |
| 6,240,285 B1 | * 5/2001 | Blum et al. | 455/404 |

* cited by examiner

*Primary Examiner*—Tracy Legree
*Assistant Examiner*—Temica M. Davis
(74) *Attorney, Agent, or Firm*—Jenkens & Gilchrist, P.C.

(57) ABSTRACT

A telecommunications system and method is disclosed for allowing a mobile station involved in a single-hop satellite call to complete a conference emergency call. One of the mobile stations involved in the single-hop satellite call activates an emergency call feature, which triggers one or both of the mobile stations to perform a call release and call re-establishment procedure. When one or both of the mobile stations performs call re-establishment, the call is marked as an Emergency Call to prevent the mobile stations from being reconnected in a single-hop call. After re-establishment, the mobile station that activated the emergency call feature transmits an Emergency Setup message to the MSC/VLR, which initiates a call connection to the Emergency Call Center (ECC). Once the MSC/VLR completes the call to the ECC, the MSC/VLR bridges all parties together in a conference call.

27 Claims, 6 Drawing Sheets

SYSTEM AND METHOD FOR BRIDGING AN EMERGENCY CALL WITH AN OPTIMIZED SATELLITE CALL

BACKGROUND OF THE PRESENT INVENTION

FIELD OF THE INVENTION

The present invention relates generally to telecommunications systems and methods for optimizing calls in a satellite network, and specifically to placing emergency calls within a satellite network.

BACKGROUND AND OBJECTS OF THE PRESENT INVENTION

Cellular telecommunications is one of the fastest growing and most demanding telecommunications applications. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and a Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR 14/16 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MS's 20 currently located within the MSC/VLR area 12. If an MS 20 roams into a new MSC/VLR area 12, the VLR 16 connected to that MSC 14 will request data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

It should be understood that the aforementioned system 10, illustrated in FIG. 1, is a terrestrially-based system. In addition to the terrestrially-based systems, there are a number of satellite systems, which work together with the terrestrially-based systems to provide cellular telecommunications to a wider network of subscribers. This is due to the fact that the high altitude of the satellite makes the satellite visible (from a radio perspective) from a wider area on the earth. The higher the satellite, the larger the area that the satellite can communicate with.

Within a satellite-based network 205, as shown in FIG. 2 of the drawings, a system of geostationary satellites 200 in orbit are used to provide communication between MS's 20 and a satellite-adapted Base Station System (SBSS) 220, which is connected to an integrated Mobile Switching Center/Visitor Location Register (MSC/VLR) (hereinafter referred to collectively as reference number 14). The MS 20 communicates via one of the satellites 200 using a radio air interface. The satellite 200 in turn communicates with one or more SBSSs 220, which consist of equipment for communicating with the satellites 200 and through the satellites 200 to the MS's 20. The antennae and satellite tracking part of the system is the Radio Frequency Terminal (RFT) subsystem 230, which also provides for the connection of the communication path to the satellite 200.

In such satellite networks 205 using geostationary satellites 200, the coverage area for a satellite 200 can be (and usually is) very large. This area can be served by a number of MSC/VLRs 14 which are connected to Public Switched Telephone Networks (PSTNs) (wireline networks), PLMNs (cellular networks) and each other. The terrestrial interconnections (trunk circuits) to these MSC/VLRs 14 are expensive to install and maintain, especially in comparison to handling the traffic over the satellite 200. Since the distances within the area served by the satellite(s) 200 are typically very large, the costs for these circuits can be enormous. In particular, the costs can be considerable if the circuits must cross remote areas or oceans.

Therefore, calls within a geostationary satellite network 205 can be optimized such that a subscriber is reallocated to the MSC/VLR 14 that is the most optimal for a given call. For example, for calls from a calling MS 20 to another MS 20 within the satellite network 205, the calling MS 20 typically re-registers in the MSC/VLR 14 of the called MS 20. In this way, it is possible to make the connection directly over the satellite 200, avoiding the additional delay caused by a double satellite-hop. Thus, only one bi-directional path is required (MS-satellite-MS) instead of two (MS-satellite-SBSS-satellite-MS). However, when an MS 20 to MS 20 call is optimized, it is currently not possible for either MS 20 to establish an emergency call in parallel to the existing single-hop call. Thus, if one of the MS's 20 wants to establish an emergency call, the single-hop call must first be disconnected, and only one of the MS's can then be connected to the Emergency Call Center (ECC).

It is, therefore, an object of the present invention to allow an MS to complete an emergency call in parallel to a single-hop satellite call.

SUMMARY OF THE INVENTION

The present invention is directed to telecommunications systems and methods for allowing a mobile station involved in a single-hop satellite call to complete an emergency call. One of the mobile stations involved in the single-hop satellite call activates an emergency call feature, which triggers one or both of the mobile stations to perform a call release and call re-establishment procedure. When one or both of the mobile stations performs call re-establishment, the call is marked as an Emergency Call to prevent the mobile stations from being reconnected in a single-hop call. After re-establishment, the mobile station that activated the emergency call feature transmits an Emergency Setup message to the MSC/VLR, which initiates a call connection to the Emergency Call Center (ECC) . Once the MSC/VLR completes the call to the ECC, the MSC/VLR bridges all parties together in a conference call.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
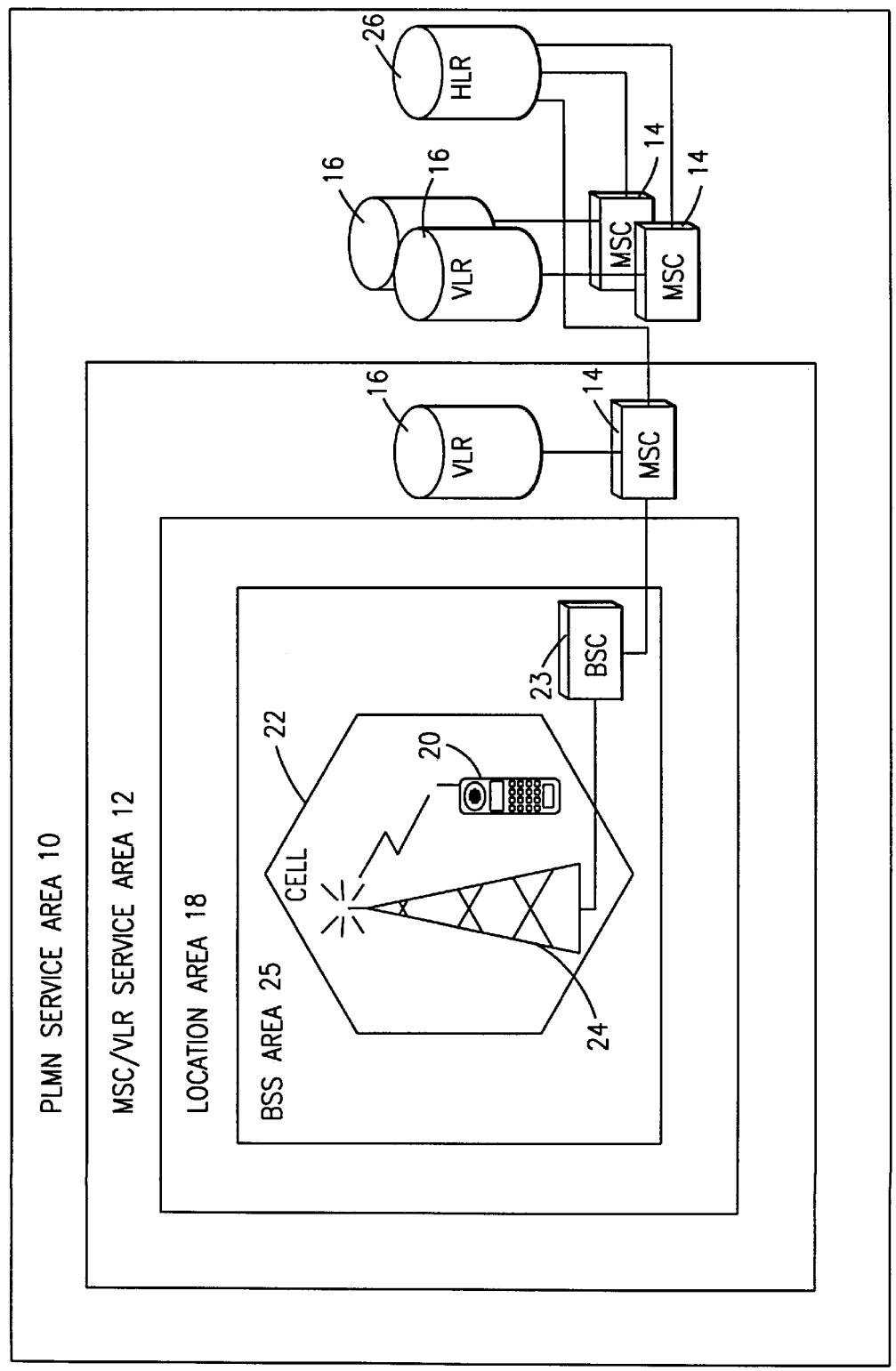
FIG. 1 is block diagram of a terrestrially-based wireless telecommunications system.
Figure 2:
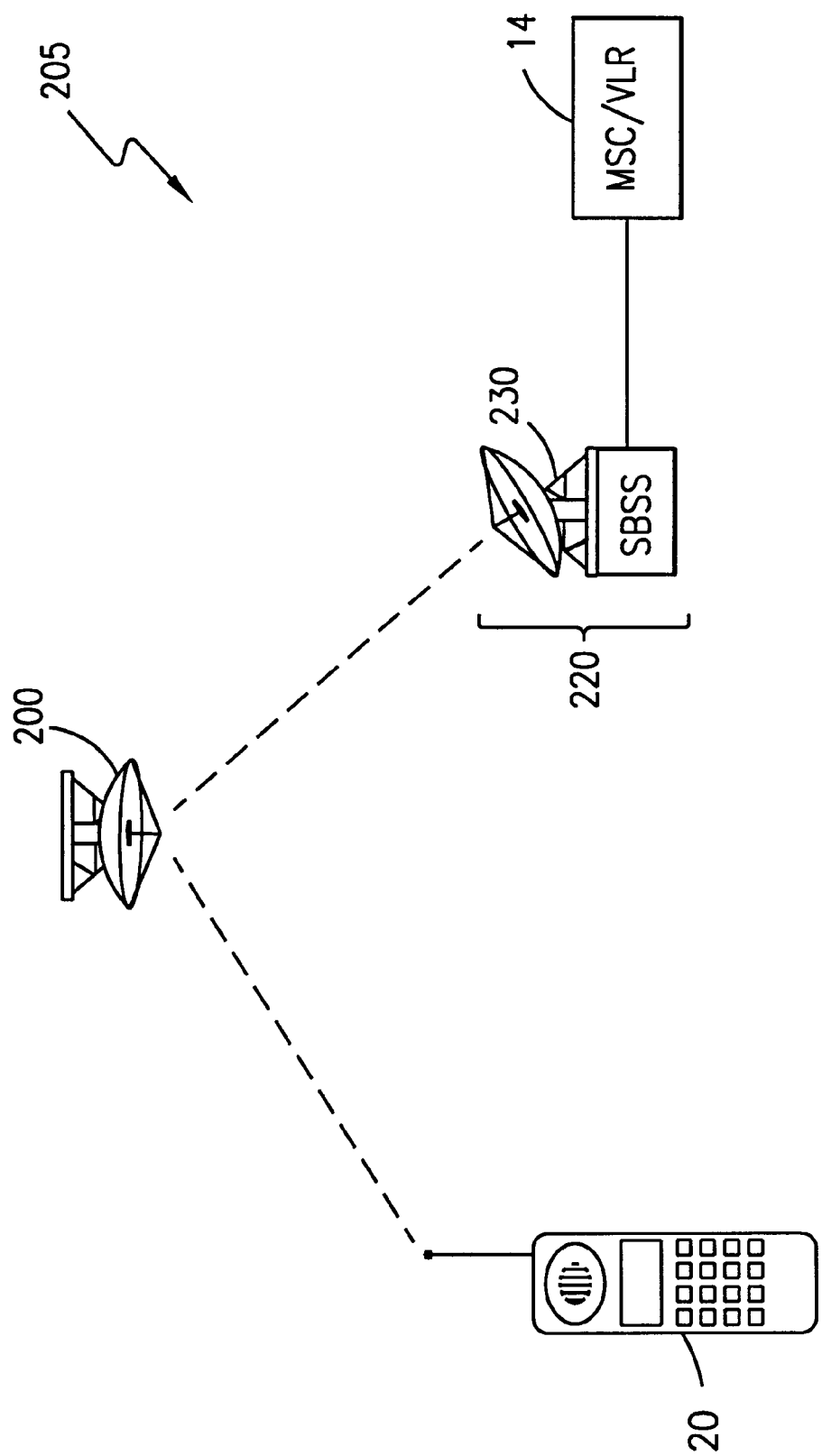
FIG. 2 is a block diagram of a satellite telecommunications system.
Figure 3:
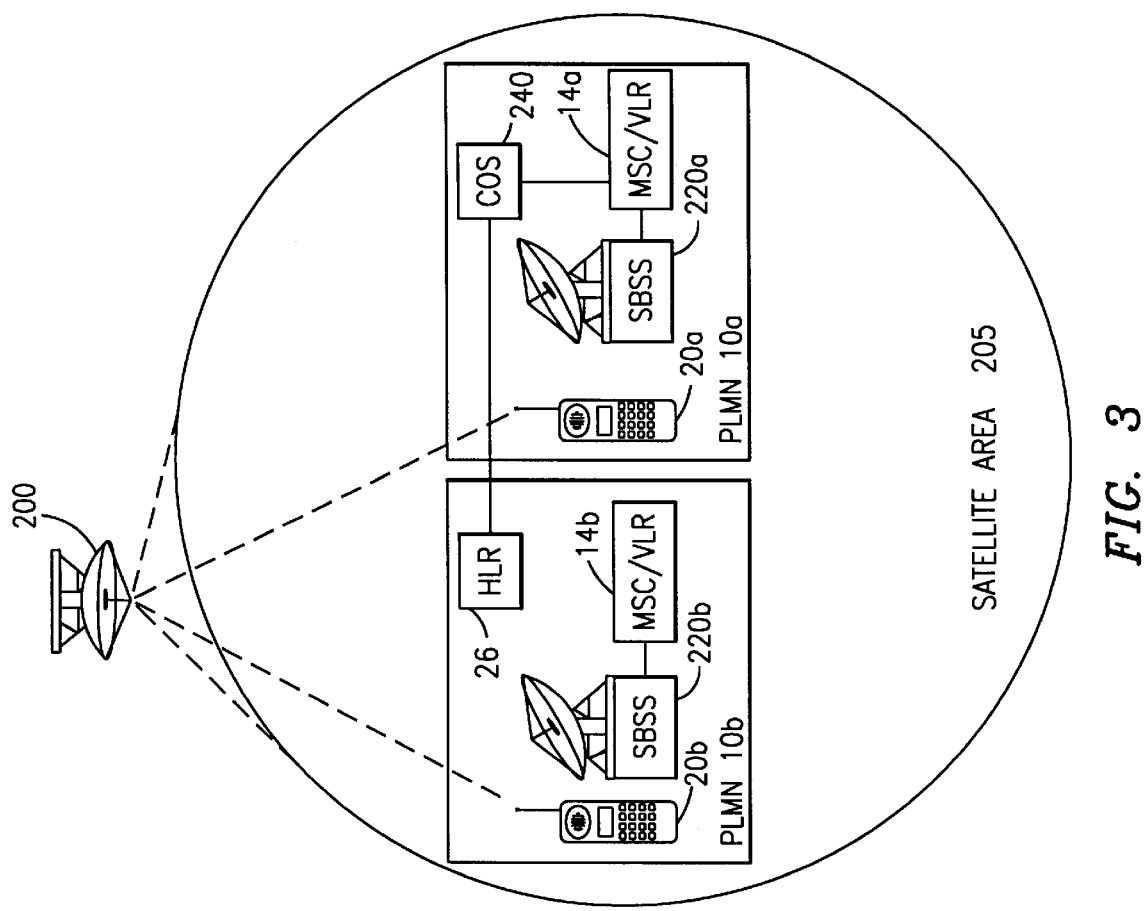
FIG. 3 illustrates optimization of a call between mobile stations in a satellite network.

With reference now to FIG. 3 of the drawings, when a calling Mobile Station (MS) 20a calls a called MS 20b within the area 205 visible to a satellite 200, a satellite-adapted Base Station System (SBSS) 220a serving the PLMN area 10a that the calling MS 20a is located in receives the Called Party Number (CPN) from the calling MS 20a. Thereafter, the SBSS 220a sends the CPN to a serving Mobile Switching Center/Visitor Location Register (MSC/VLR) 14a. If the serving MSC/VLR 14a determines that the CPN is not a number registered within the serving MSC/VLR 14a, the digit string for the CPN is sent to a Call Optimization Server (COS) 240 for pre-analysis. The COS 240 determines that the call is a MS 20a to MS 20b call, queries a Home Location Register (HLR) 26 of the called MS 20b for the current location of the called MS 20b, and assigns a transaction identifier to be used for making the connection between the two MSs (20a and 20b).

Thereafter, the COS 240 sends an Unstructured Supplementary Service Data (USSD) string to the calling MS 20a, which requests the calling MS 20a to re-register itself on an MSC/VLR 14b serving the called MS 20b via an SBSS 220b serving the called MS 20b. The USSD string also includes the transaction identifier. In this way, satellite resources can be conserved by performing the connection for these calls using only the satellite 200, e.g., only one bi-directional path is required (MS-satellite-MS) instead of two (MS-satellite-SBSS-satellite-MS). This one bi-directional path connection is commonly known as a single-hop satellite call, whereas the two bi-directional path connection is referred to as a double-hop satellite call.

After re-registration in the desired MSC/VLR 14b, normal call setup procedures take place, with the addition of an indicator that this is a MS 20a to MS 20b call and the transaction identifier. The MS 20a to MS 20b call indicator is used to disable functions requiring terrestrial switch connections. The transaction identifier is used when channel assignments are done and the connection is made to ensure that the right channels can be connected with the satellite 200. Once the connection is made through the satellite 200, the transaction identifier is released.

Figure 4:
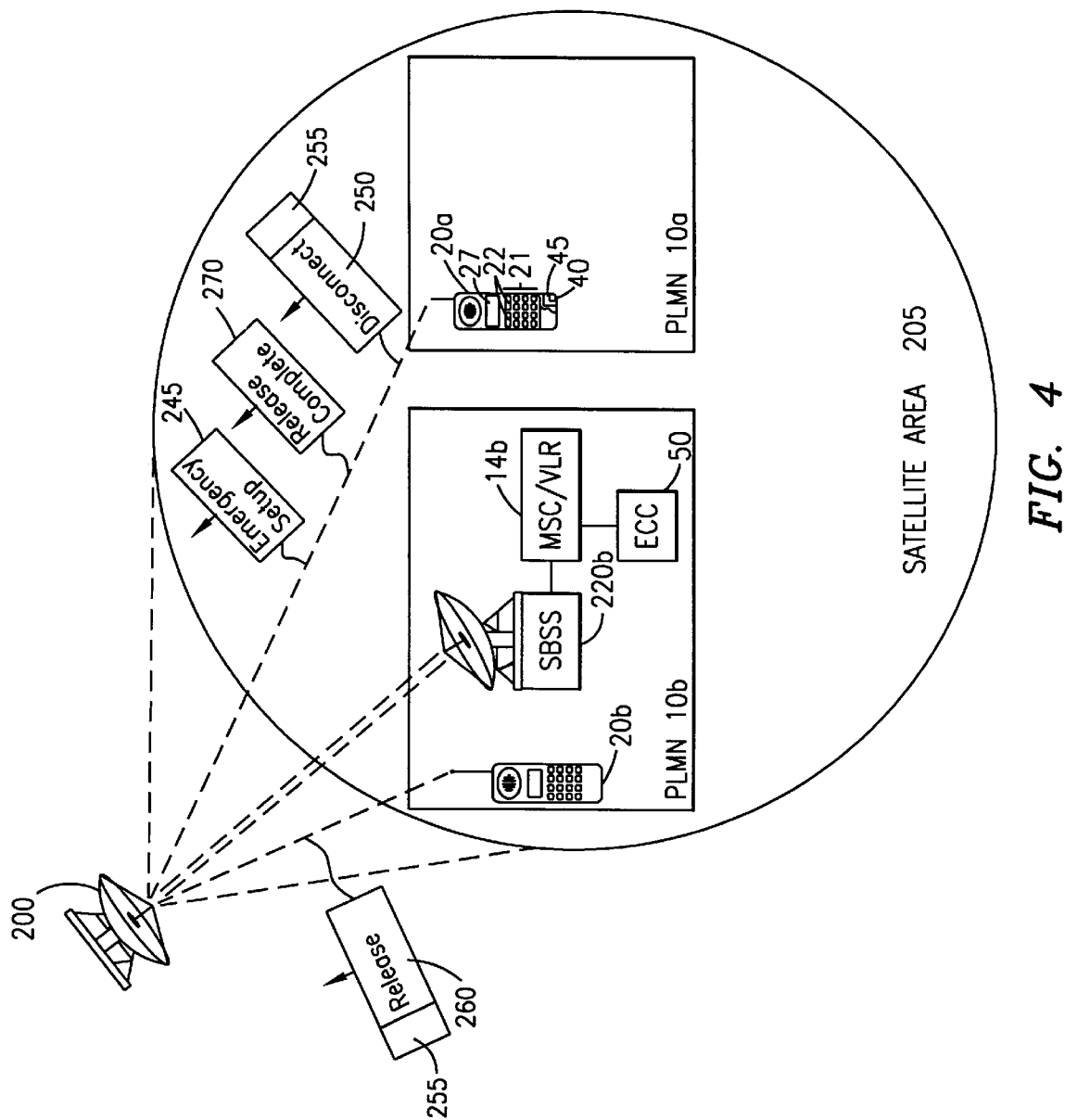
FIG. 4 illustrates establishing an emergency call in parallel to an existing optimized satellite call in accordance with preferred embodiments of the present invention.

However, when an MS 20a to MS 20b call is optimized in the aforementioned manner, it is not possible for either MS 20a or 20b to place an emergency call in parallel to the optimized call. Therefore, as shown in FIG. 4 of the drawings, and in accordance with one preferred embodiment of the present invention, in order for either MS 20a or 20b to place an emergency call in parallel to an existing single-hop satellite call, one or both of the MSs 20 involved in the single-hop call must have an emergency call feature 40 associated therewith, which gives the MS 20a and/or 20b the ability to establish an emergency call in parallel to a single-hop call. This emergency call feature 40 is preferably stored in a memory 45, such as a Subscriber Identity Module (SIM) card, in the MS 20a or 20b.

In a preferred embodiment, if both MSs 20a and 20b have the emergency call feature 40, the parallel emergency call can be established by one of the MSs 20a or 20b activating their emergency call feature 40. This feature 40 can be activated by pressing one or a sequence of emergency keys on a keypad 21 of the MS 20 or by using function keys 22 on the MS 20 to select the emergency call feature 40 from a menu of services displayed on a display 27 of the MS 20. Activating the emergency call feature 40 triggers both MSs 20a and 20b to perform a call release and call re-establishment procedure. After the call release, and during the call re-establishment procedure, the call is marked as an emergency call so that the MSs 20a and 20b are not reconnected again in a single-hop call. After re-establishment, the activating MS 20a or 20b transmits an Emergency Setup message 245 to the optimal MSC/VLR 14b, which initiates a connection to an Emergency Call Center (ECC) 50 within the area 10a served by the optimal MSC/VLR 14b. When the call is completed to the ECC 50, all parties 20a, 20b and 50 are bridged together.

Figure 5:
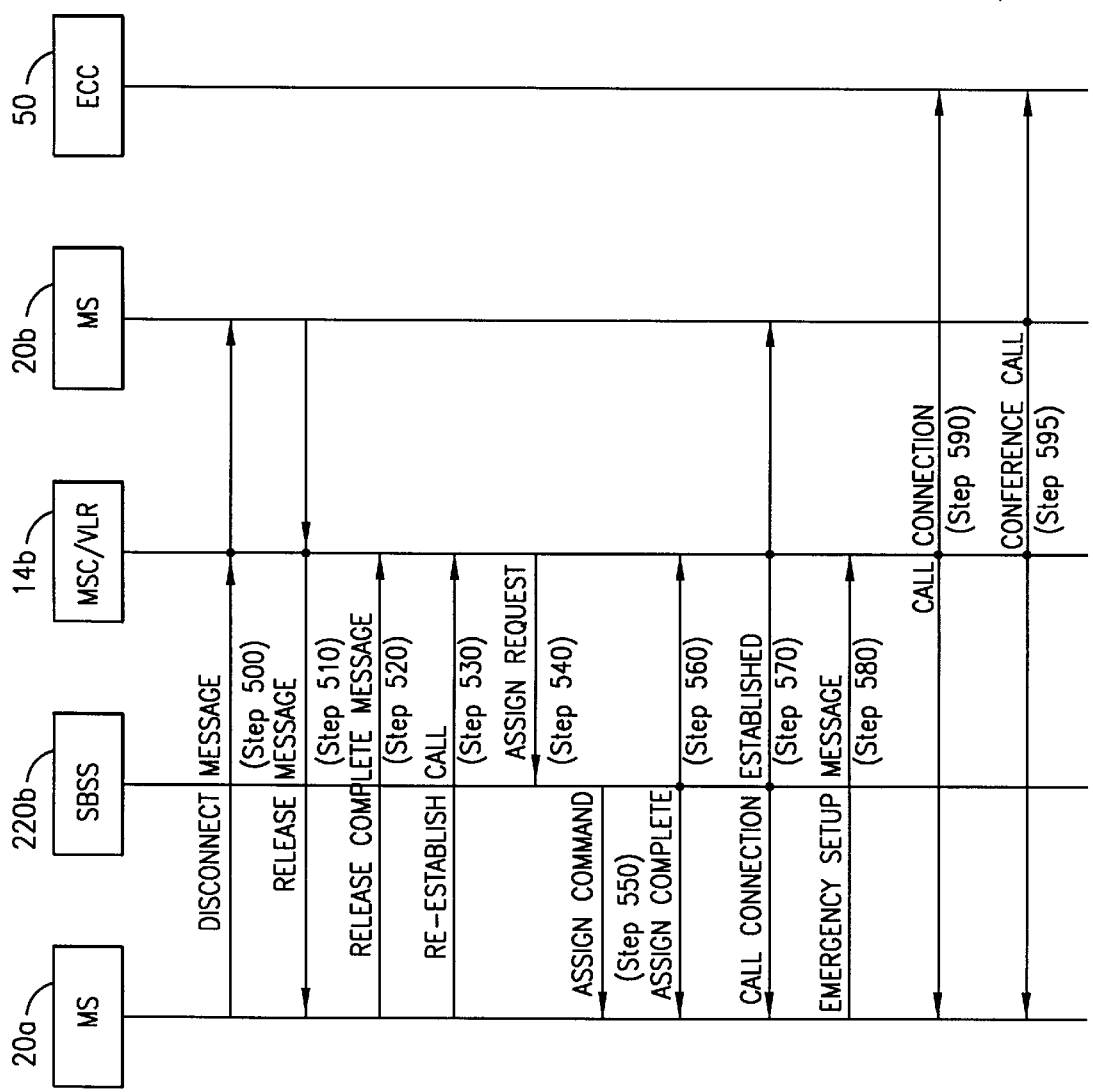
FIG. 5 illustrates the steps for establishing the parallel emergency call shown in FIG. 4 of the drawings.

A sample call release and call re-establishment procedure is shown in FIG. 5 of the drawings. Upon activation of the emergency call feature 40, MS 20a transmits a DISCONNECT message 250 to the other MS 20b, which is relayed to the optimal MSC/VLR 14b via satellite 200 (step 500). Upon receipt of the DISCONNECT message 250, MS 20b transmits a RELEASE message 260 to the other MS 20a, which is also relayed to the MSC/VLR 14b via satellite 200 (step 510). To release the call, MS 20a transmits a RELEASE COMPLETE message 270 to the MSC/VLR 14b via satellite 200 (step 520). When the call is released, both MS's 20a and 20b will experience an interruption in voice communication until the call connection is re-established.

An indication 255 that each MS 20a and 20b has the emergency call feature 40 can be included in a separate message or as a part of the DISCONNECT 250 and RELEASE 260 messages, respectively. In this case, both MSs 20a and 20b have the emergency call feature 40, and therefore, both MSs 20a and 20b perform the call re-establishment procedure. The call re-establishment procedure is similar to normal GSM call re-establishment procedures, with minor modifications to allow for quicker call connection. Only the call re-establishment procedure for MS 20a is shown in FIG. 5 of the drawings. However, it should be understood that the call re-establishment procedure for MS 20b mirrors that of MS 20a. To begin call re-establishment, after the single-hop satellite call has been released, MS 20a automatically transmits a re-establishment call setup message with an indication that the call should not be a single-hop call to the optimal MSC/VLR 14b via satellite 200 (step 530). Thereafter, the optimal MSC/VLR 14b requests the SBSS 220b associated with the optimal MSC/VLR 14b to assign a traffic channel to the MS 20a (step 540). The SBSS 220a assigns a channel and instructs the MS 20a to activate the traffic channel (step 550). Upon activation, the MS 20a transmits an assignment complete message to the MSC/VLR 14b (step 560). Once the MSC/VLR 14b has received the assignment complete message from both MSs 20a and 20b, a double-hop satellite call connection is established (step 560) between MS 20a and MS 20b. The double-hop satellite call connection is from MS 20a, through the satellite 200, SBSS 220b and MSC/VLR 14b, back through the SBSS 220b, and to MS 20b via satellite 200. It should be understood that the SBSS 220 used by MS 20a and 20b can be different.

Once the original call has been re-established (step 570), the original double-hop satellite call is put on hold, while the connection to the ECC 50 is initiated. It should be noted that the ECC 50 connection may be initiated as soon as MS 20a finishes the call re-establishment procedure. For example, once MS 20a transmits the Assignment Complete message (step 560), MS 20a can transmit the Emergency Setup message 245 to the optimal MSC/VLR 14b (step 580). The MSC/VLR 14b establishes a call connection between the ECC 50 and MS 20a (step 590). After the call between MS 20a and MS 20b is completed, and the call between MS 20a and the ECC 50 is completed, the MSC/VLR 14b can conference all parties together in a three-way call through a CCD device (conference circuit device) of the type known in the art within the MSC/VLR 14b (step 595).

In an alternative embodiment, if MS 20b does not support the emergency call feature, e.g., the indication 555 is not included in the RELEASE message 560, the MSC/VLR 14b can either establish a normal emergency call between MS 20a and the ECC 50 (without conferencing MS 20b) or, after MS 20a has completed call re-establishment, the MSC/VLR 14b can page MS 20b and establish a call connection between MS 20a and MS 20b. The decision to conference MS 20b can be made by either MS 20a or the MSC/VLR 14b. For example, when MS 20a receives the RELEASE message 560 without the indication 555 from MS 20b, MS 20a can decide to release the call and transmit the Emergency Setup message 545 without initiating the call re-establishment. Alternatively, MS 20a can attempt to re-establish a double-hop satellite call connection with MS 20b by initiating the call re-establishment procedure. If MS 20a performs the call re-establishment procedure, the MSC/VLR 14b can decide to either page MS 20b and attempt to complete the call or not allow MS 20a to re-establish a call connection with MS 20b. If the MSC/VLR 14b chooses the latter, the MSC/VLR 14b preferably sends a message (not shown), such as a Short Message Service (SMS) message or Unstructured Supplementary Service Data (USSD), to MS 20a informing MS 20a that the call to MS 20b cannot be re-established.

In some cases, if the MSC/VLR 14b connects the emergency call to the ECC 50 in the PLMN 10b of the optimal MSC/VLR 14b, that ECC 50 may not be the correct ECC 50 for the type of emergency involved. For example, since MS 20a initiates the emergency call, the ECC 50 in PLMN 10b may be hundreds of miles away, and unable to render the appropriate emergency aid effectively.

Figure 6:
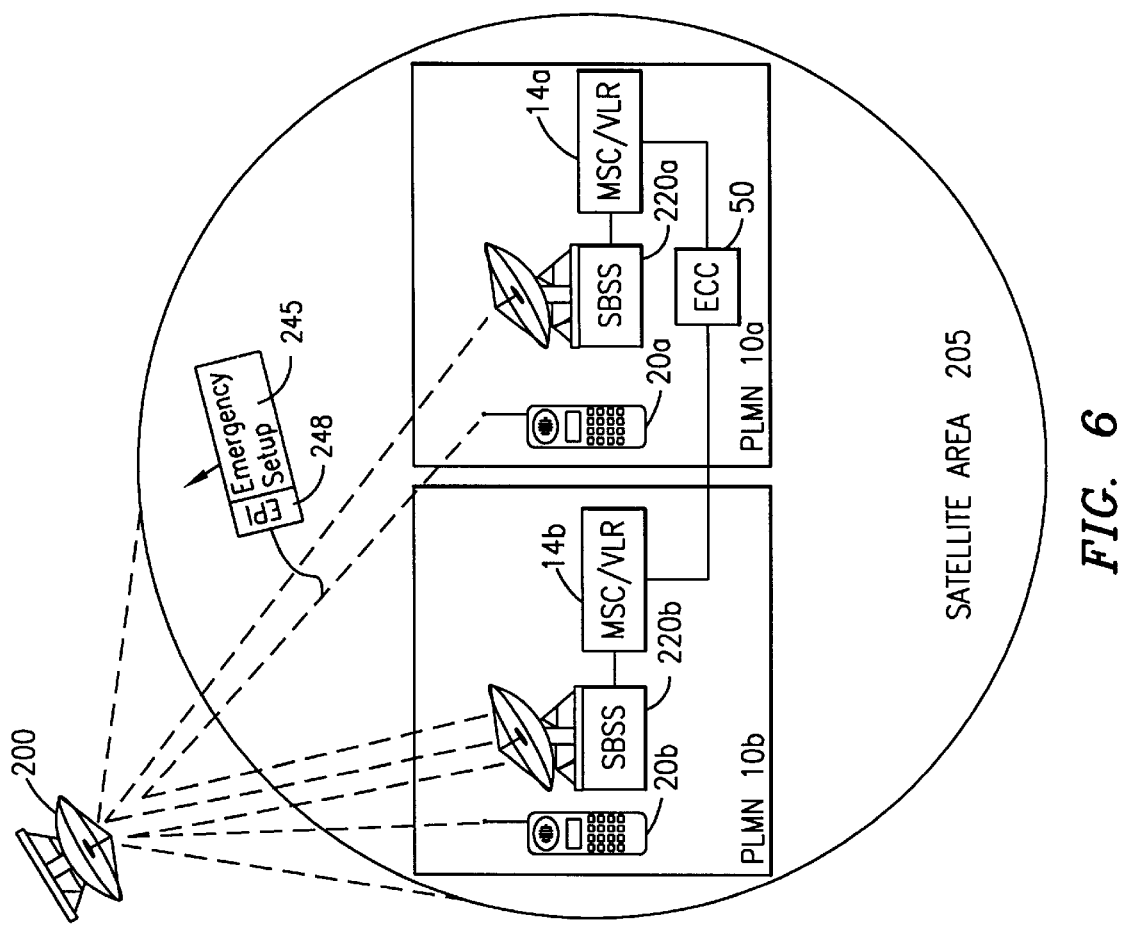
FIG. 6 illustrates establishing an emergency call to the correct Emergency Call Center in parallel to an existing optimized satellite call in accordance with embodiments of the present invention.

Therefore, with reference now to FIG. 6 of the drawings, in an alternative embodiment, when MS 20a activates the emergency call feature 40, the mobile subscriber associated with MS 20a can indicate whether the emergency relates to MS 20a or MS 20b. This emergency party information 248 can be included with the Emergency Setup message 245 sent by MS 20a. Thus, when the optimal MSC/VLR 14b receives the Emergency Setup message 245 and emergency party information 248, the MSC/VLR 14b can determine the correct ECC 50 to connect the emergency call to.

For example, if MS 20a is the emergency party, the optimal MSC/VLR 14b can determine the PLMN 10a of MS 20a, and route the call to the ECC 50 within PLMN 10a. It should be understood that each PLMN 10a and/or 10b can contain more than one ECC 50, and therefore, the correct ECC 50 can be determined by ascertaining the Location Area, MSC/VLR area, cell or geographical location, e.g., X, Y coordinates, of the MS 20a. The connection to the correct ECC 50 can be completed directly from the optimal MSC/VLR 14b over trunk lines or through the SBSS 220a and MSC/VLR 14a within the PLMN 10a of MS 20a via satellite 200.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A satellite network for establishing an emergency call in parallel to an existing satellite call, comprising:

first and second mobile stations involved in a single-hop satellite call via a satellite, said first mobile station including an emergency call feature for activating said emergency call; and a mobile switching center in wireless communication with said first and second mobile stations via said satellite, said mobile switching center disconnecting said single-hop satellite call, re-establishing a double-hop satellite call between said first and second mobile stations and establishing an emergency call in parallel to said double-hop satellite call in response to activation of said emergency call feature.

2. The satellite network of claim 1, wherein said first mobile station further comprises a memory for storing said emergency call feature.

3. The satellite network of claim 2, wherein said memory is a Subscriber Identity Module.

4. The satellite network of claim 1, wherein said first mobile station transmits a disconnect message to said second mobile station via said satellite, said disconnect message being detected by said mobile switching center.

5. The satellite network of claim 4, wherein said disconnect message includes an indication that said first mobile station has said emergency call feature associated therewith.

6. The satellite network of claim 4, wherein said second mobile station transmits a release message to said first mobile station, said release message being detected by said mobile switching center.

7. The satellite network of claim 6, wherein said release message includes an indication that said second mobile station has said emergency call feature associated therewith.

8. The satellite network of claim 7, wherein said first and second mobile stations each perform a respective call re-establishment procedure to said mobile switching center substantially simultaneously.

9. The satellite network of claim 6, wherein said first mobile station performs a call re-establishment procedure to said mobile switching center, said mobile switching center paging said second mobile station to establish said double-hop satellite call between said first and second mobile stations.

10. The satellite network of claim 1, wherein said first mobile station transmits an emergency setup message to said mobile switching center to initiate connection of said emergency call.

11. The satellite network of claim 10, further comprising an emergency call center, said emergency call being connected between said emergency call center and said first and second mobile stations.

12. The satellite network of claim 11, wherein said emergency call center is located within an area served by said mobile switching center.

13. The satellite network of claim 11, wherein said emergency call center is located within an area including an emergency party, said emergency party being said first or second mobile station.

14. The satellite network of claim 13, wherein an identification of said emergency party is included within said emergency setup message, said mobile switching center connecting said emergency call to said emergency call center within said area of said emergency party.

15. The satellite network of claim 14, wherein said mobile switching center connects said emergency call to said emergency call center via said satellite and an additional mobile switching center when said emergency call center is located within an area served by said additional mobile switching center.

16. A method for establishing an emergency call in parallel to an existing satellite call, comprising the steps of:

establishing a single-hop satellite call between first and second mobile stations via a satellite;

activating, by said first mobile station, an emergency call feature within said first mobile station;

releasing said single-hop satellite call;

re-establishing a double-hop satellite call between said first and second mobile stations; and establishing an emergency call in parallel to said double-hop satellite call.

17. The method of claim 16, wherein said step of releasing further comprises the step of:

transmitting a disconnect message from said first mobile station to said second mobile station via said satellite.

18. The method of claim 17, wherein said step of releasing further comprises the steps of:

transmitting a release message from said second mobile station to said first mobile station; and transmitting a release complete message from said first mobile station to a mobile switching center in wireless communication with said first and second mobile stations via said satellite.

19. The method of claim 18, wherein said release message comprises an indication that said second mobile station has said emergency call feature associated therewith, said step of re-establishing further comprising the step of:

performing, by each said first and second mobile stations, a respective call re-establishment procedure to said mobile switching center substantially simultaneously.

20. The method of claim 18, wherein said step of re-establishing further comprises the step of: performing, by said first mobile station, a call re-establishment procedure to said mobile switching center; and paging, by said mobile switching center, said second mobile station to re-establish said double-hop satellite call between said first and second mobile stations.

21. The method of claim 16, wherein said step of establishing said emergency call further comprises the step of:

transmitting an emergency setup message from said first mobile station to said mobile switching center; and connecting said emergency call between an emergency call center and said first and second mobile stations.

22. The method of claim 21, wherein said step of establishing said emergency call further comprises the step of:

transmitting an identification of an emergency party within said emergency setup message, said emergency party being said first or second mobile station; and connecting said emergency call, by said mobile switching center, to said emergency call center located within an area associated with the location of said emergency party.

23. The method of claim 22, wherein said step of connecting further comprises the step of:

connecting, by said mobile switching center, said emergency call to said emergency call center via said satellite and an additional mobile switching center when said emergency call center is located within an area served by said additional mobile switching center.

24. A method for establishing a conference emergency call by a first mobile station when said first mobile station is involved in a single-hop satellite call with a second mobile station via a satellite, comprising the steps of:

activating an emergency call feature on said first mobile station;

releasing said single-hop satellite call;

performing a call re-establishment procedure to a mobile switching center in wireless communication with said first and second mobile stations via said satellite to establish a double-hop satellite call between said first and second mobile stations; and transmitting an emergency setup message to said mobile switching center to initiate connection of said emergency call between said first and second mobile stations and an emergency call center.

25. The method of claim 24, wherein said step of releasing further comprises the step of:

transmitting a disconnect message from said first mobile station to said second mobile station via said satellite.

26. The method of claim 25, wherein said step of releasing further comprises the step of:

transmitting a release complete message from said first mobile station to said mobile switching center via said satellite.

27. The method of claim 24, wherein said step of transmitting further comprises the step of:

transmitting an identification of an emergency party within said emergency setup message, said emergency party being said first or second mobile station, said emergency call center being located within an area associated with the location of said emergency party.

* * * * *